United States Patent
Diab

(10) Patent No.: US 7,949,004 B2
(45) Date of Patent: May 24, 2011

(54) METHOD AND SYSTEM FOR DATA EXCHANGE WITH A MULTIMEDIA AND ETHERNET ENABLED LAN SUBSYSTEM

(75) Inventor: Wael William Diab, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 835 days.

(21) Appl. No.: 11/839,366

(22) Filed: Aug. 15, 2007

(65) Prior Publication Data

US 2008/0285589 A1 Nov. 20, 2008

Related U.S. Application Data

(60) Provisional application No. 60/917,870, filed on May 14, 2007.

(51) Int. Cl.
*H04L 12/12* (2006.01)

(52) U.S. Cl. .................. 370/419; 370/463; 709/250

(58) Field of Classification Search .......... 370/419–421, 370/463; 709/231, 250
See application file for complete search history.

(56) References Cited

U.S. PATENT DOCUMENTS

| | | | |
|---|---|---|---|
| 6,185,737 B1 * | 2/2001 | Northcutt et al. | 725/110 |
| 7,024,461 B1 * | 4/2006 | Janning et al. | 709/207 |
| 7,519,073 B2 * | 4/2009 | Caspi et al. | 370/410 |
| 7,624,417 B2 * | 11/2009 | Dua | 725/114 |
| 7,694,027 B2 * | 4/2010 | Montag | 710/7 |
| 2004/0174905 A1 * | 9/2004 | Caspi et al. | 370/486 |
| 2006/0117371 A1 * | 6/2006 | Margulis | 725/131 |
| 2009/0031419 A1 * | 1/2009 | Laksono | 726/21 |

* cited by examiner

*Primary Examiner* — Pankaj Kumar
*Assistant Examiner* — Duc T Duong
(74) *Attorney, Agent, or Firm* — McAndrews, Held & Malloy, Ltd.

(57) ABSTRACT

Aspects of a method and system for data exchange with a multimedia and Ethernet enabled LAN subsystem are provided. A multimedia networking interface may be enabled to process multimedia data and communicate the data between a networking interface and one or both of a graphics processor and an audio processor. In some instances, the networking interface may comprise a LAN interface and may enable communicating multimedia data over a network. The multimedia networking interface may be enabled to communicate auxiliary and/or control data associated with communicated multimedia content. The multimedia networking interface may process multimedia content prior to or subsequent to transmission of said content. In this regard, the multimedia networking interface may be enabled to parse, format, encapsulate, decapsulate, packetize, depacketize, and/or otherwise format the multimedia content.

26 Claims, 6 Drawing Sheets

METHOD AND SYSTEM FOR DATA EXCHANGE WITH A MULTIMEDIA AND ETHERNET ENABLED LAN SUBSYSTEM

CROSS-REFERENCE TO RELATED APPLICATIONS/INCORPORATION BY REFERENCE

This patent application makes reference to, claims priority to and claims benefit from U.S. Provisional Patent Application Ser. No. 60/917,870 filed on May 14, 2007.

The above stated application is hereby incorporated herein by reference in its entirety.

FIELD OF THE INVENTION

Certain embodiments of the invention relate to signal processing. More specifically, certain embodiments of the invention relate to a method and system for data exchange with a multimedia and Ethernet enabled LAN subsystem.

BACKGROUND OF THE INVENTION

The generation and rendering of high end graphics often involves the movement of large quantities of data. Frequently the data is stored in a server, from which it may be accessed by users at computer workstations via a network. Once the data is received at the computer workstation, the graphics may be displayed on an attached video monitor. In many cases the video monitor is physically separate and has been conventionally attached to the computer workstation via an analog interface, such as a video graphics array (VGA) interface, or a digital interface such as a digital visual interface (DVI). In a typical configuration, an interface in the computer workstation is connected to a compatible interface in the video monitor via an interstitial connector, such as a cable.

The ever increasing amount of multimedia content, and in particular, high quality multimedia content is presenting a number of challenges to designers and administrators of computing platforms and network alike. For example, bandwidth, hardware, and the isochronous nature of multimedia file transfers are all factors limiting the quality and availability of the multimedia content. In this regard a number of standards have been developed for transporting high quality multimedia data for presentation. For example, the digital video interface (DVI) and High Definition Multimedia Interface (HDMI) represent two of the most widely adopted and utilized display interfaces. However, DVI and HDMI each have a number of drawbacks which Video electronics Standards Association (VESA) has attempted to address with the newly emerging DisplayPort (DP) standard. In this regard, DP may offer, for example, increased bandwidth and more advanced copy protection as compared to DVI or HDMI.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for data exchange with a multimedia and Ethernet enabled LAN subsystem to enable network transmission of multimedia content, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for data exchange with a multimedia and Ethernet enabled LAN subsystem.

Aspects of a method and system for data exchange with a multimedia and Ethernet enabled LAN subsystem are provided. In this regard, a multimedia networking interface may be enabled to process multimedia data and communicate the data between a networking interface and one or both of a graphics processor and an audio processor. In some instances, the networking interface may comprise a LAN interface and may enable communicating multimedia data over a network. The multimedia networking interface may be enabled to communicate auxiliary and/or control data associated with communicated multimedia content. Aspects of the invention may enable the multimedia networking interface to process multimedia content prior to or subsequent to transmission of said content. In this regard, the multimedia networking interface may be enabled to parse, format, encapsulate, decapsulate, packetize, depacketize, and/or otherwise format the multimedia content. In this manner, aspects of the invention may enable encapsulation of data into one or more protocol data units such as DisplayPort micro-packets. Additionally, various aspects of the invention may enable coding and/or transcoding multimedia content of a first format to multimedia content of a second format. In this regard, exemplary formats may comprise DVI, HDMI, DisplayPort. Furthermore, the multimedia content may be compliant with one or more of MPEG, MPEG-2, MPEG-4, and/or MPEG-4 part 10 standards.

Figure 1A:
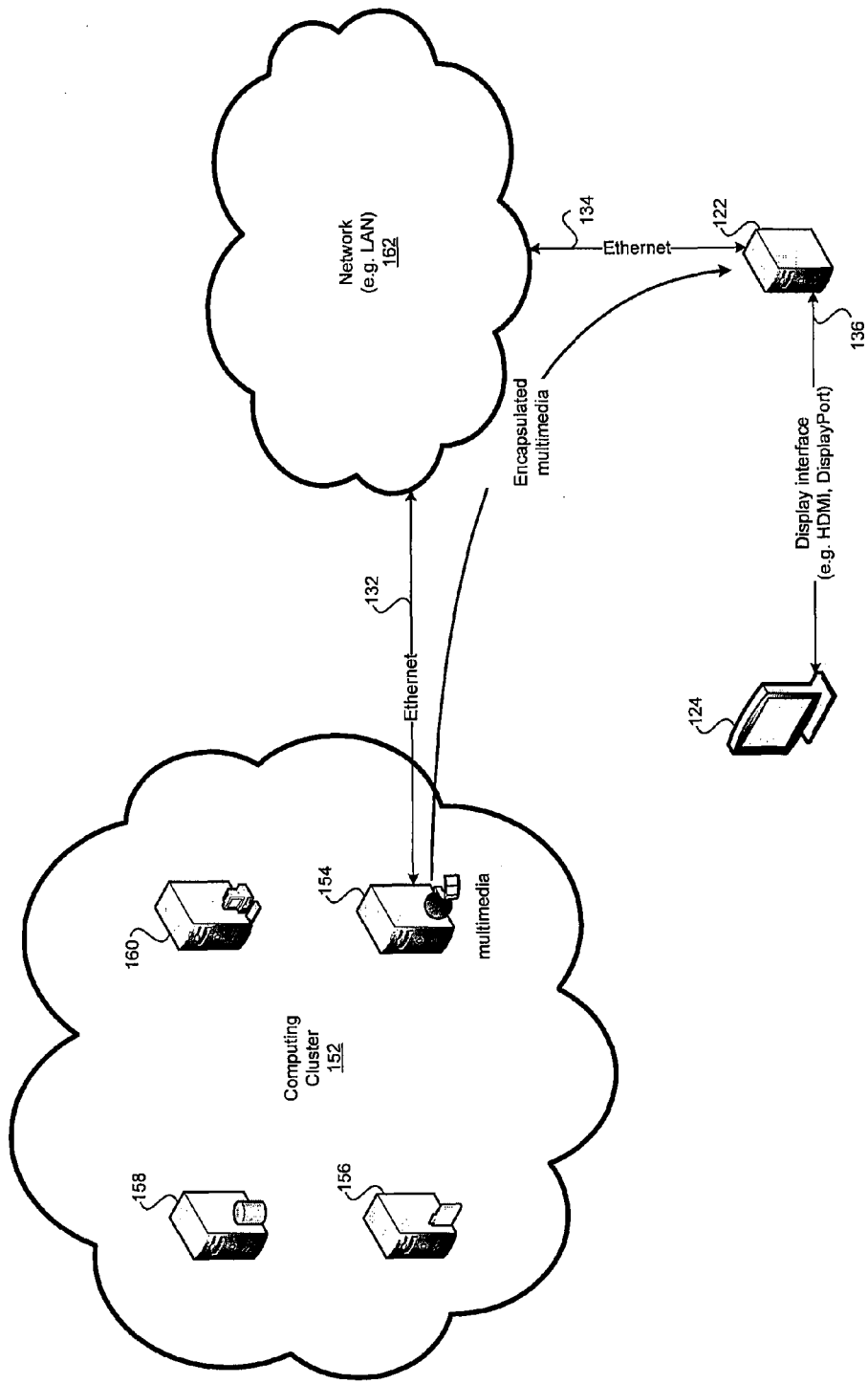
FIG. 1A is a diagram illustrating an exemplary system for transfer of high definition multimedia data across a network, in accordance with an embodiment of the invention.

FIG. 1A is a diagram illustrating an exemplary system for transfer of HD multimedia data across a network, in accordance with an embodiment of the invention. Referring to FIG. 1A, there is shown a computing cluster 152, a network 162, a computing device 122 and a multimedia monitor 124. The computing cluster 152 may comprise a multimedia server 154, a file server 156, a database server 158 and a network management server 160.

The computing cluster 152 may comprise a plurality of servers, each of which may perform one or more specific tasks, or execute one or more specific applications. Each server may store data which may be accessible to users at computing device 122, which are attached to the network 162. The servers within the computer cluster 152 may communicate with each other, and/or with the network 162 via Ethernet interfaces. The multimedia server 154 may store computer graphics data in addition to storing video, audio and/or multimedia programs. The multimedia monitor 124 may enable the rendering and presentation of video, audio, and/or graphics, for example.

The multimedia server 154 may comprise hardware and/or software, which enables processing of graphics, video, audio and/or multimedia data. The multimedia, graphics, video, and/or audio (collectively referred to herein as multimedia) stored at the multimedia server 154 may be accessible via the network 162. The file server 156 may store one or more files. The file server 156 may be utilized, for example, to store files from various users. The database server 158 may store one or more database programs, applications and/or files. The network management server 160 may store information pertaining to the configuration and/or availability of various network communications devices and/or interfaces. The network management server 160 may utilize a protocol such as the simple network management protocol (SNMP). The computing device 122 and multimedia monitor 124 may communicate via a display interface such as DVI, HDMI, or DisplayPort. The computing device 122 may communicate with the network 162 via an Ethernet interface.

In an exemplary operation, the multimedia server 154 may encapsulate multimedia data in one or more Ethernet frames. The format of the Ethernet frames may be specified in applicable standards documents, such as IEEE 802 standards. The Ethernet frames may contain an address (for example, in a destination address field within the Ethernet frames), which indicates that the Ethernet frames are to be transported across the network 162, and delivered to the computing device 122. The Ethernet frames may comprise a designation (for example, in an EtherType field of the Ethernet frames), which indicates that the Ethernet frame is being utilized to encapsulate multimedia content of a particular format. Formats may include, for example, raw audio/video, HDMI, and DisplayPort. The Ethernet frames may also comprise a traffic class identifier, which may enable the network 162 to provide services in accordance with AudioNideo Bridging and/or AudioNideo Bridging extensions (any combination of which is referred to herein as "AVB"). These services may comprise prioritized transport of the Ethernet frames across the network 162 to enable the time duration for transport across the network 162 to meet latency targets associated with the specified traffic class.

The multimedia server 154 may transport the Ethernet frames via an Ethernet interface connector 132 to the network 162. The Ethernet frames may subsequently be transported from the network 112 to the computing device 122 via an Ethernet interface connector 134. An exemplary Ethernet interface connector may be a category 5 cable.

Upon receipt of the Ethernet frames, the computing device 122 may determine (for example, based on an identifier in the EtherType field of the received Ethernet frames) that the received Ethernet frames contain HD multimedia content. The computing device 122 may extract the multimedia content and may send it to the multimedia monitor 124 via the display interface connector 136. The display interface connector 136 may enable physical connection between the computing device 122 and the multimedia monitor 124 via a point-to-point connection. The HD multimedia content may then be rendered for display at the multimedia monitor 124.

In various embodiments of the invention, point-to-point oriented traffic, which may not be network aware or contain a means of network identification (such as a network destination address, for example) may be encapsulated in Ethernet frames at a centralized server (such as a multimedia server 154), and transported across a network 162 (such as a LAN, for example). The point-to-point oriented traffic may comprise HD multimedia content such as Display Port micro-packets, or even raw data generated by an application program. The encapsulated traffic may be de-encapsulated at a network destination device (such as the computing device 122) and delivered to a destination multimedia device (such as the multimedia monitor 124). Thus, in various embodiments of the invention, from the perspective of the application (s), which enable the generation of the point-to-point oriented traffic (such as Display Port, for example), the centralized server (such as the multimedia server 154) may transport the point-to-point oriented traffic to the destination multimedia device 124 across a network 162 as though the multimedia device 124 were directly attached to the centralized server via a Display Port interface.

In various embodiments of the invention, the tasks required of the computing device 122 may comprise reception of Ethernet frames via the Ethernet interface connector 134, determination that the Ethernet frames may contain encapsulated HD multimedia content, extraction of the HD multimedia content from the Ethernet frames, and transfer of the content to the multimedia monitor 124 via the display interface connector 136. In this regard, the multimedia server 154 may generate instructions for rendering the multimedia on the monitor 124 instead of requiring that this task be performed within the computing device 122. Thus, various embodiments of the invention may enable the computing device 122 to be a "thin client" device, which may not require high performance hardware and/or software capabilities to enable the generation of multimedia content for high performance video and/or graphics applications. This in turn may enable the rendering of high performance video and/or graphics on multimedia monitors 124 which are attached to low cost computing devices 122.

Figure 1B:
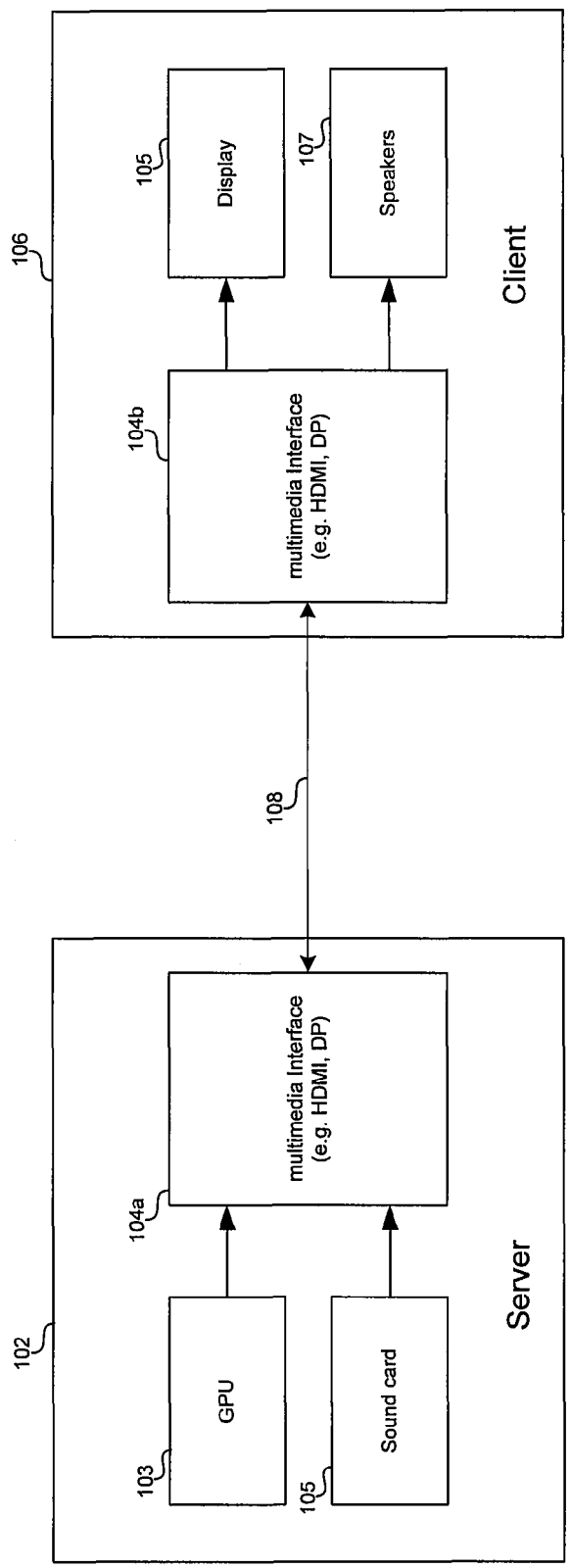
FIG. 1B is block diagram illustrating a multimedia system, in accordance with an embodiment of the invention.

FIG. 1B is block diagram illustrating a multimedia system, in accordance with an embodiment of the invention. Referring to FIG. 1B there is shown a server 102 and a client 106, each comprising a multimedia interface 104.

The server 102 may comprise suitable logic circuitry, and/or code that may enable generating and/or outputting multimedia data. In this regard, the server 102 may comprise a graphics processing unit (GPU) 103 which may generate video data and convey the video data to the multimedia interface 104a. Similarly, the server 102 may comprise a sound card 105 which may generate audio data and convey the audio data to the multimedia interface 104a. Accordingly, the multimedia interface 104a may format the data according to one or more standards/protocols associated with the multimedia interface and may transmit the multimedia and any associated control data over the physical link 108. For example, the multimedia interface may be a DisplayPort (DP) interface and may format the data by packetizing it into DP "micro-packets", which may contain multimedia data and/or associated control data. After packetization, the multimedia interface 104a may convert the "micro-packets" into DP physical layer signals for transmission over the physical link 108.

The client 106 may comprise suitable logic circuitry, and/ or code that may enable rendering and/or presenting multimedia data. In this regard, the server 102 may comprise a display 105 which may be enabled to receive video/graphics data from the multimedia interface 104b and present the video information to a user. Similarly, the server 102 may comprise speakers 107 which may be enabled to receive audio data from the multimedia interface 104b and present the audio information to a user. Accordingly, the multimedia interface 104b may de-packetize and/or reformat received multimedia data and associated auxiliary/control data to generate content suitable for rendering or presentation by the display 105 and/or the speakers 107

The physical link 108 may, for example, comprise twisted pair cabling, coaxial cabling, fiber optic cabling, and/or one or more wireless channels. In an exemplary embodiment, the physical link 108 may comprise 4 video lanes, an auxiliary lane, and a hot plug detect suitable for a DisplayPort connection.

The system 100 may be limited in terms of distance between the server 102 and client 106 due to limitations of the multimedia interface. Additionally, incorporating the multimedia interface 104a, and 104b into the server 102 and the client 106 may be infeasible with existing platforms and technology due to cost and/or space constraints, for example. Accordingly, aspects of the invention may enable extending the range of multimedia information by enabling multimedia information to be carried over a network. In this regard, high data rates associated with multimedia data may be too large to be carried over traditional connections to a LAN subsystem. For example, traditional architectures may connect to a LAN subsystem via a southbridge (I/O controller hub) which may not be capable of handling the data rates of the multimedia traffic.

Figure 2:
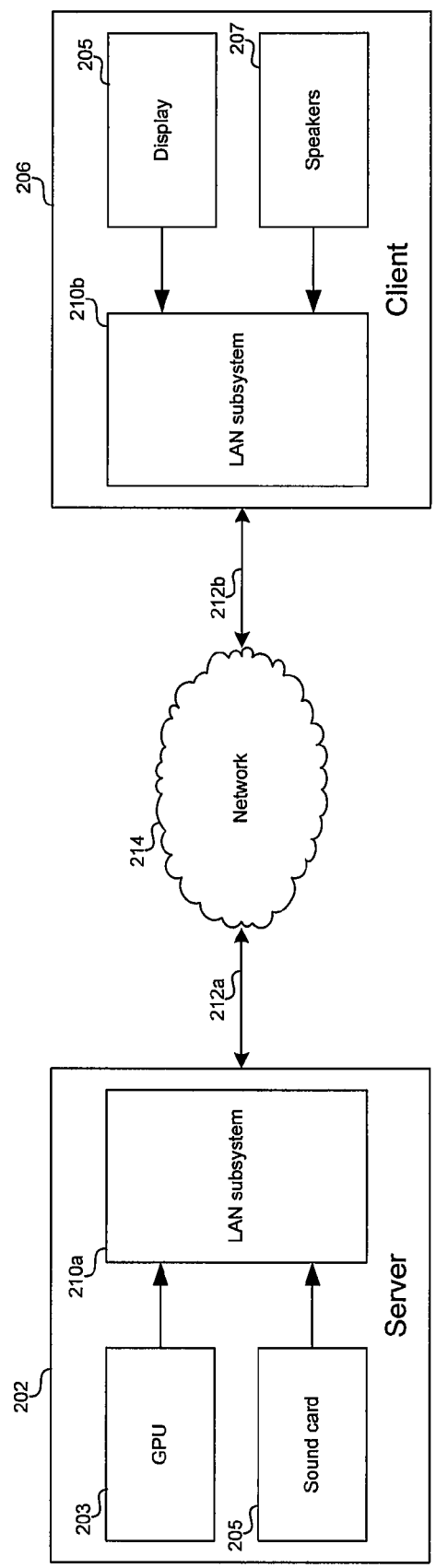
FIG. 2 is a diagram illustrating transmission of DP data over a network, in accordance with an embodiment of the invention.

FIG. 2 is a diagram illustrating transmission of multimedia data over a network, in accordance with an embodiment of the invention. Referring to FIG. 2 there is shown a server 202 and a client 206 which may exchange multimedia traffic via the network 214.

The network 214 may comprise one or more physical links and/or network hardware devices. In an exemplary embodiment of the invention the network 210 may comprise one or more Ethernet switches, which may be AVB enabled, and/or one or more unshielded twisted pair cables with 8 position 8 conductor (8P8C) modular connectors on either end.

The server 202 may comprise suitable logic circuitry, and/or code that may enable generating and/or outputting multimedia data. In this regard, the server 202 may be enabled to generate and/or process multimedia data and forward that data to a remote client. The server 202 may comprise a GPU 203, a sound card 205, and a LAN subsystem 210a. The GPU 203 may comprise suitable logic, circuitry, and/or code that may enable generating graphics/video data. In this regard, resolution, encoding, format, compression, data rates, and/or other characteristics of video/graphics out of the GPU 203 may vary without deviating from the scope of the invention. The sound card 205 may comprise suitable logic, circuitry, and/or code that may enable generating audio data. In this regard, resolution, encoding, format, compression, data rates, and/or other characteristics of an audio stream out of the sound card 205 may vary without deviating from the scope of the invention.

The LAN subsystem 210a may comprise suitable logic, circuitry, and/or code that may enable transmitting and/or receiving multimedia data and associated auxiliary/control data over a network. The LAN subsystem 210a may be enabled to utilize AVB. The LAN subsystem 210 may utilize Ethernet protocols for transmitting and/or receiving data into the network 210. Additionally, the LAN subsystem may be enabled to format, encode, packetize, compress, decompress, or otherwise process multimedia data.

In an exemplary embodiment of the invention, the GPU 103 may generate video/graphics and may transfer the video/graphics to the LAN subsystem 210a for additional processing and/or formatting according to one or more standards. Accordingly, the server 202 may comprise one or more busses and/or bus interfaces for communicating multimedia information between the GPU 103 and/or the sound card 105 and the LAN subsystem 210a. In one embodiment of the invention, the GPU may output raw video/graphics to the LAN subsystem 210a. In another embodiment of the invention, the GPU may output formatted video/graphics, DisplayPort micro-packets, for example, to the LAN subsystem 210a. The LAN subsystem 210a may encapsulate multimedia data in to Ethernet frames and transmit the frames into the network 214.

The client 206 may comprise suitable logic circuitry, and/or code that may enable rendering and/or presenting multimedia data In this regard, the server 202 may be enabled to generate and/or process multimedia data and forward that data to a remote client. The client 206 may comprise a display 205, one or more speakers 207, and a LAN subsystem 210b. The display 205 may comprise suitable logic, circuitry, and/or code that may enable receiving video data and presenting it to a user. In this regard, the display may be enabled to render, format, decompress, or otherwise process the video for presentation to a user. For example, the display 205 may be enabled to receive DP "micro-packets" and present the video content of the "micro-packets" to a user. The speaker(s) 207 may comprise suitable logic, circuitry, and/or code that may enable receiving audio data and presenting it to a user. In this regard, the display may be enabled to render, format, decompress, or otherwise process the audio for presentation to a user. For example, the speaker(s) 207 may be enabled to receive audio via a DisplayPort auxiliary channel and present the audio to a user. The LAN subsystem 210b may comprise suitable logic, circuitry, and/or code that may enable transmitting and/or receiving multimedia and associated control data over a network. The LAN subsystem 210a may be enabled to utilize AVB. The LAN subsystem 210 may utilize Ethernet protocols for transmitting and/or receiving data into the network 210. Additionally, the LAN subsystem may be enabled to format, encode, packetize, compress, decompress, or otherwise process multimedia data.

In an exemplary embodiment of the invention, the LAN subsystem 210b may receive multimedia data over the network 214 via the physical link 212b. The LAN subsystem 210b may de-packetize, parse, format, and/or otherwise process the received data and may convey received video data to the display 205 and may convey received audio data to the speaker(s) 207. Accordingly, the client 206 may comprise one or more busses and/or bus interfaces for communicating multimedia information between the display 205 and/or the speakers 207 and the LAN subsystem 210b. In one embodiment of the invention, the LAN subsystem 210a may, for example, receive Ethernet frames and extract/reconstruct DP "micro-packets" from received Ethernet frames. The LAN subsystem 210b may convey the "micro-packets" to the display 205 and/or the speaker(s) 207. In another embodiment of the invention, the LAN subsystem 210b may extract the audio and/or video data from the micro-packets and convey raw multimedia data to the display 205 and/or the speaker(s) 207.

Figure 3:
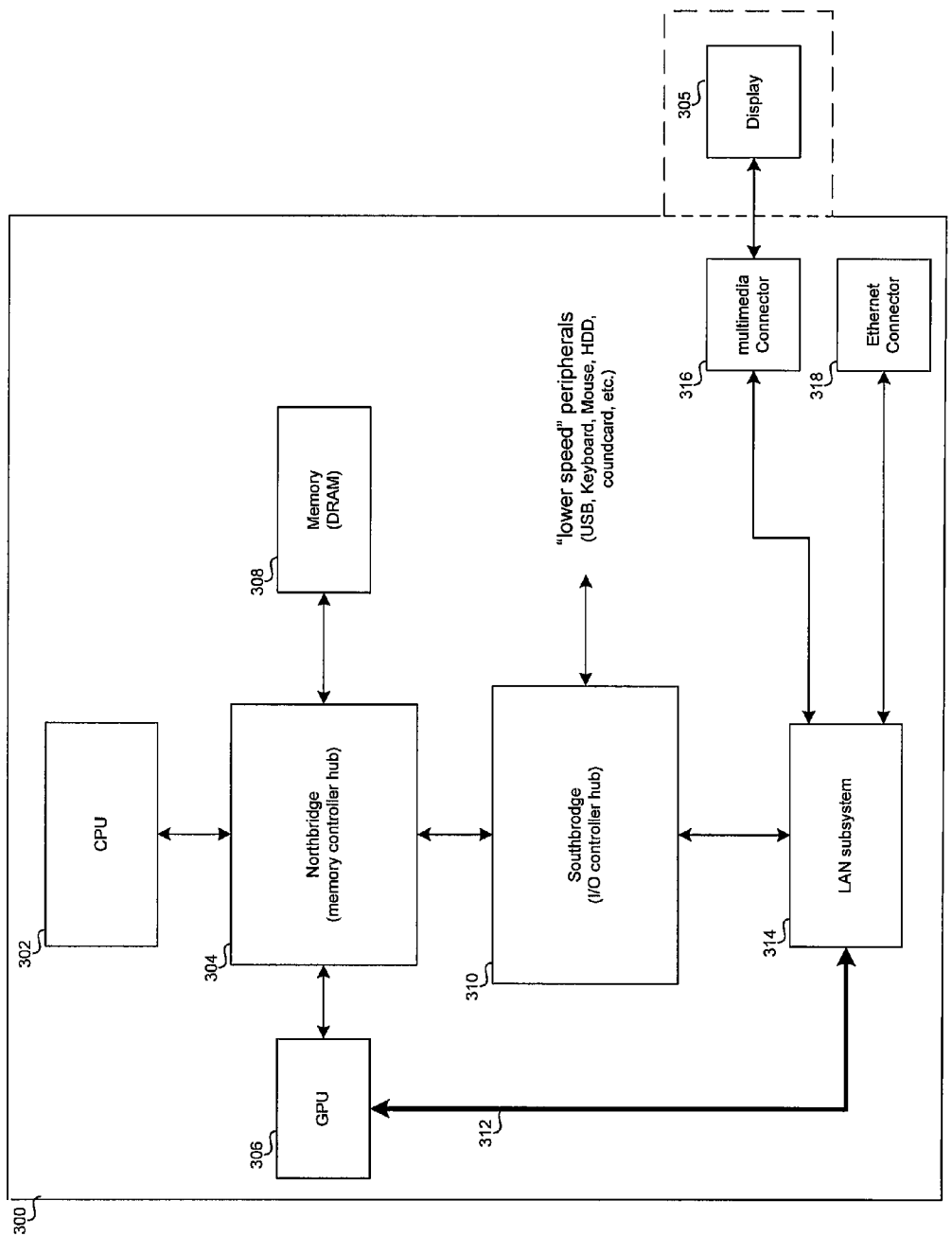
FIG. 3 is a diagram illustrating an exemplary system enabled to transmit and/or receive DP and/or Ethernet datastreams, in accordance with an embodiment of the invention.

FIG. 3 is a diagram illustrating an exemplary system enabled to transmit and/or receive multimedia datastreams and/or Ethernet datastreams, in accordance with an embodiment of the invention. Referring to FIG. 3 the system 300 may comprise a CPU 302, a northbridge 304, a graphics processing unit 306, a memory block 308, a southbridge 310, a LAN subsystem 314, an multimedia interface connector 316, and an Ethernet connector 318.

The CPU 302 may comprise suitable logic, circuitry, and/or code that may enable processing data and/or controlling operations of the system 300. In this regard, the CPU may be enabled to provide control signals to the various other blocks comprising the system 300. The CPU 302 may also enable execution of applications programs and/or code. The applications programs and/or code may enable generation of video and/or audio. The CPU 302 may also enable the retrieval of stored video and/or audio. The CPU 302 may be accessed via the northbridge 304.

The GPU 306 may comprise suitable logic, circuitry, and/or code for generating, rendering, [de]compressing, [en/de] crypting, or otherwise manipulating graphics information. The GPU may be enabled to output a raw video stream to the LAN subsystem 314. The GPU may be enabled to output graphics/video to the LAN subsystem 314 via the bus 312. In this regard, the graphics/video may, for example, comprise raw pixel data, DisplayPort packets, or data formatted according to DVI or HDMI standards.

In various embodiments of the invention the CPU and GPU may, for example, each comprise one or more processors and/or circuits, or may be integrated into a single processor and/or circuit. In this manner, operations performed by the CPU and/or GPU may be partitioned in a variety of ways without deviating from the scope of the present invention.

The northbridge 304 may comprise suitable logic, circuitry, and/or code that may enable the handling of "high speed" data transfers in the system 300. For example, the northbridge 304 may handle data transfers between the CPU 302, the Memory block 308, and the GPU 306.

The display 305 may comprise suitable logic, circuitry, and/or code that may enable rendering and/or presentation of multimedia to a user. In this regard, the display 305 may be enabled to receive a multimedia datastream and render/present the data contained in the multimedia datastream. In various embodiments of the invention, the display 305 may be enabled to modify, format, or otherwise manipulate the multimedia prior to displaying it. In various embodiments of the invention, the display 305 may be integrated into the display 305 or may be an external display connected to the system 300 via a connecting cable.

The memory 308 may comprise suitable logic, circuitry, and/or code that may enable storage of data. For example, the memory 308 may be enabled to store video data which may be transferred to/from the GPU via the northbridge 304. The memory 308 may additionally store data, for example, configuration data and/or state variables utilized in controlling/configuring the various blocks of the system 300.

The southbridge 310 may comprise suitable logic, circuitry, and/or code that may enable handling of "lower speed" communications in the system 300. For example, the southbridge 310 may handle communications between northbridge 304, the LAN subsystem 314 and lower speed peripherals such as a sound card, a hard disk drive, a universal serial bus, a keyboard, and/or a mouse.

The LAN subsystem 314 may comprise suitable logic, circuitry, and/or code that may enable transmission and/or reception of multimedia and/or Ethernet data. The LAN subsystem 314 may comprise PHY layer functions and MAC layer functions. In this regard, the LAN subsystem 314 may enable packetization/de-packetization of Ethernet and multimedia datastreams. Also, the LAN subsystem may enable coordination of communications between the system 300 and one or more remote systems. In this regard, the LAN subsystem may enable utilization of AVB. Additionally, the LAN subsystem may be enabled to convert data bits to physical signals and output the symbols onto a physical link. Similarly, the LAN subsystem may be enabled to receive symbols via a physical link, convert them into bits of data, and assemble the bits into protocol data units (e.g. Ethernet frames and/or DP micro-packets). In this regard, exemplary physical links may include twisted pair cables and/or wireless channels. Additionally, the LAN subsystem 314 may enable transmission and/or reception of Ethernet frames at various transfer rates, such as 10 Mbps, 100 Mbps, 1,000 Mbps (or 1 Gbps), 10 Gbps, and/or non-standard transfer rates, such as 2.5 Gbps, 5 Gbps, 40 Gbps, and 100 Gbps, for example. In various embodiments of the invention, the LAN subsystem 314 may comprise one or more chips, be implemented on one or more die, be implemented on a motherboard, or in numerous other forms without deviating from the scope of the invention.

The multimedia interface connector 316 may enable physical connection to a multimedia interface, such as DVI, HDMI, or DisplayPort. In one embodiment of the invention, connector 316 may be a DisplayPort connector and the physical link may comprise at least conductors for each of the 4 lanes in the Display Port interface and for an auxiliary (AUX) lane. The 4 video lanes may enable the transmission or reception of Display Port mini-packets containing video data, while the AUX lane may enable transmission and reception of audio signals, control signals, input from peripheral devices such as keyboards and/or mice, and encryption keys. In various embodiments of the invention, the multimedia interface connector 316 may connect the system 300 to a display 305.

The Ethernet connector 318 may enable physical connection to an Ethernet Physical link which may comprise, for example, one or more twisted pairs. The Ethernet connector 318 may enable physical connection via an 8P8C modular connector, such as a RJ-45 connector, for example. In various embodiments of the invention, the Ethernet connector 318 may provide a physical connection to enable communication of general Ethernet traffic, and/or multimedia traffic utilizing AVB between the system 300 and a remote system. In various embodiments of the invention, a single Ethernet connector 318 may be utilized for Ethernet and DP traffic in which case the DP connector 316 may be absent. In various other embodiments of the invention, a single DP connector 316 may be utilized for Ethernet and DP traffic in which case the DP connector 318 may be absent.

In various embodiments of the invention, the system 300 may also be enabled to convert between multimedia formats. For example, the system 300 may be enabled to receive HDMI data via the Ethernet connector 318, convert the data to DP, and transmit the DP data via the DP connector 316.

The bus 312 may couple the GPU 306 to the LAN subsystem 314. In this regard, the bus 312 may enable transporting multimedia content, such as audio, video, and/or combined audio/video, and associated auxiliary/control data between the GPU 306 and the LAN subsystem 314 without involving other blocks of the system 300, such as the northbridge 304 and the southbridge 310. In various embodiments of the invention, the bus 312 may comprise one or more serial and/or parallel transmission mediums. Additionally, differential and/or single ended signaling with one or more signal levels may be utilized for communicating data over the bus 312. Also, the number and/or size of the transmission mediums, the number of signal levels, the signaling method, the protocols utilized for bus arbitration, packetization, encapsulation, compression, and/or other characteristic of the bus 312 and/or circuitry associated therewith may be scalable and/or alterable based on, for example, type, format, and/or data rate of multimedia content and/or associated auxiliary/control data.

In an exemplary transmit operation, the system 300 may represent a server, such as the server 202 of FIG. 2 and may transmit data via an Ethernet and/or a multimedia interface. For example, the GPU 306 may output multimedia to the LAN subsystem 314 via the bus 312. The LAN subsystem 314 may packetize the multimedia into an Ethernet datastream and/or a DP datastream, for example. Additionally, the LAN subsystem 314 may convert the Ethernet and/or DP datastreams to physical symbols and may output the physical symbols via the multimedia interface connector 316 and/or the Ethernet connector 318.

In an exemplary receive operation, the system 300 may represent a client, such as the client 204 of FIG. 2, and may receive data via an Ethernet and/or a multimedia interface, such as DisplayPort. In this regard, the LAN subsystem 314 may receive physical symbols via the multimedia interface connector 316 and/or the Ethernet connector 318, and may convert these symbols to bits of data. Additionally, the LAN subsystem 314 may assemble the data according to Ethernet and/or one or more multimedia interface standards. A datastream received via the multimedia interface connector 316 may comprise associated auxiliary/control data associated with a connection to the display 305. In this regard, the LAN subsystem may convey the auxiliary data to an appropriate block comprising the system 300 or may encapsulate the data into an Ethernet datastream for transmission to a remote system. In one embodiment of the invention, received multimedia and/or associated auxiliary/control data may be conveyed to the GPU 306 via the bus 302. An Ethernet datastream received via the Ethernet connector 318 may comprise multimedia encapsulated in an Ethernet datastream. In this regard, the LAN subsystem 314 may extract/reconstruct the multimedia from the Ethernet datastream. Accordingly, the multimedia may be output to the display 305 via the multimedia interface connector 316. The display 305 may render or otherwise manipulate the multimedia for presentation to a user.

Although FIG. 3 illustrates the bus 312 enabling communication of multimedia data between the GPU 302 and the LAN subsystem 314, the invention is not limited in this regard. Accordingly, additional devices, such as a sound card, may be coupled to the bus 312. Also, various exemplary embodiments of the invention may comprise multiple busses similar to the bus 312. For example, a system such as the system 300 may comprise a first bus 312 between a GPU and a LAN subsystem and may comprise a second bus 312 between a sound card or audio processor and the LAN subsystem. Additionally, the busses may be differently scaled such that they are enabled to handle different data rates.

Figure 4:
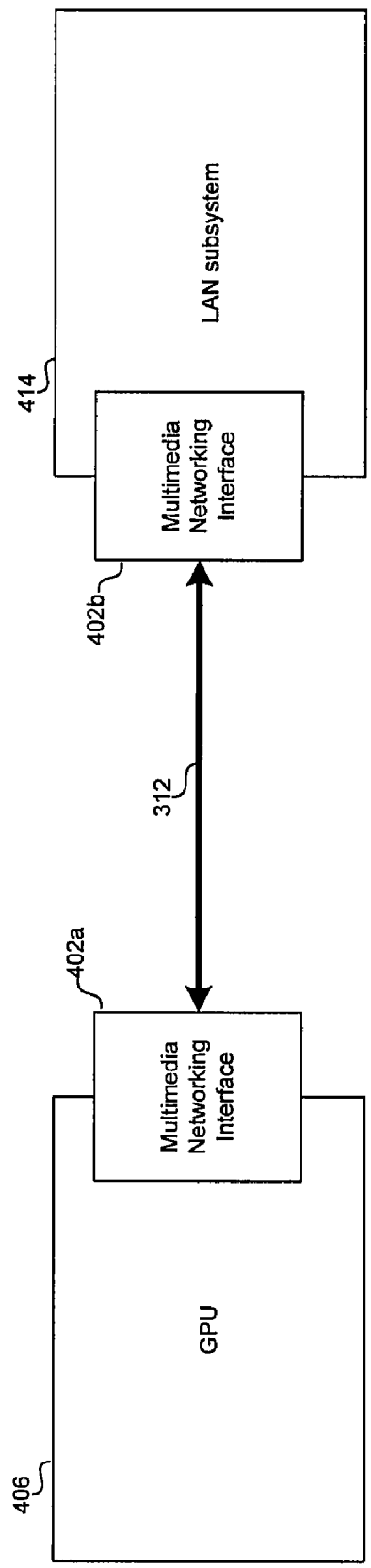
FIG. 4 is a block diagram illustrating the communication of multimedia data between a GPU and a LAN subsystem via a multimedia networking interface, in accordance with an embodiment of the invention.

FIG. 4 is a block diagram illustrating the communication of multimedia data between a GPU and a LAN subsystem via a multimedia networking interface, in accordance with an embodiment of the invention. Referring to FIG. 4 there is shown a GPU 406 and a LAN subsystem 414 coupled via a bus 312. The GPU 406 and the LAN subsystem each comprise a multimedia interface integrated within a networking interface, which may be referred to as a multimedia networking interface (MNI) 402.

The GPU 406 may comprise suitable logic, circuitry, and/or code that may enable generating, rendering, compressing, decompressing, encrypting, decrypting, and/or otherwise processing the graphics information. In this regard, the GPU 406 may be similar to or the same as the GPU 306 of FIG. 3.

The LAN subsystem 414 may comprise suitable logic, circuitry, and/or code that may enable transmission and/or reception of multimedia and/or Ethernet data. In this regard, the LAN subsystem 414 may be similar to or the same as the LAN subsystem 314 of FIG. 3.

The bus 312 may couple the GPU 406 and the LAN subsystem 414 to enable the transference of multimedia data between the GPU 406 and the LAN subsystem 414. In various embodiments of the invention, the bus 312 may comprise one or more physical connections coupled in series and/or parallel.

The multimedia networking interface (MNI) 402 may comprise suitable logic, circuitry, and/or code that may enable communication of multimedia traffic between a multimedia processor and a LAN subsystem via a standardized bus. In this regard, the MNI may provide a universal way for interfacing to a multimedia data bus. In this regard, the MNI 402 may be enabled to implement one or more protocols for communicating over the bus 312. The MNI 402 may enable processing, and/or communication of multimedia data to a LAN subsystem without involving other blocks of a system such as a CPU, northbridge, and southbridge. Accordingly, the MNI 402 may enable "off the shelf" GPUs and LAN subsystems to exchange multimedia content. Moreover, the MNI 402 may be addressable and/or may enable addressing multiple devices, such as video processors and audio processors, which may be coupled to a common bus such as the bus 312. The MNI 402 may support the conveyance of multimedia data over a network by parsing, formatting, or otherwise processing data in such a way as to reduce the processing required by the LAN subsystem and/or the GPU 406. For example, the MNI 402 may be enabled to add headers, remove headers, packetize data, de-packetize data, encapsulate data, and/or decapsulate data from a GPU prior to conveying the data to the LAN subsystem. For example, the MNI 402a may receive DisplayPort packets from the GPU 406. Accordingly, the MNI 402 may extract the multimedia content from DP micro-packets and transmit the content onto the bus 312. Furthermore, the MNI 402 may be enabled to process and/or communicate auxiliary and/or control data associated with multimedia content. Subsequently, the MNI 402b may receive the content and provide it to the LAN subsystem 414 such that it may be packetized into Ethernet frames with minimal processing required by the LAN subsystem 414. The MNI 402 may be enabled to perform bus arbitration of the bus 312. In various embodiments of the invention, the MNI 402 may be enabled to receive data from a memory via a memory controller or via direct memory access, for example. In various exemplary embodiments of the invention, the MNI 402 may comprise integrated and/or discrete components and all or part of the MNI 402 may be integrated on a common substrate with other functions or may reside on one or more separate substrates.

In various embodiments of the invention, the MNI 402 may be enabled to encode or transcode between multimedia formats. For example, the MNI 402 may be enabled to convert between two or more of a variety of graphics (e.g. still images, video, and/or text) formats. In this regard, exemplary graphic formats may comprise raw pixel data, DVI, HDMI, and DisplayPort. Moreover, multimedia data may comprise one or more data streams compliant with MPEG, MPEG-2, MPEG-4, MPEG-4 PART 10 standards. Similarly, the MNI 402 may be enabled to convert between audio formats such as PCM (pulse code modulated) audio, AAC, and MP3.

Figure 5:
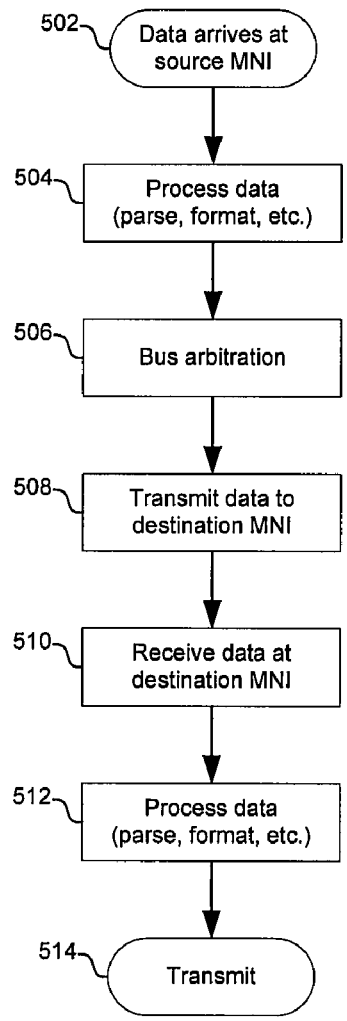
FIG. 5 is a flow chart illustrating an exemplary communication of multimedia content between multimedia networking interfaces, in accordance with an embodiment of the invention.

FIG. 5 is a flow chart illustrating an exemplary communication of multimedia content between multimedia networking interfaces, in accordance with an embodiment of the invention. Referring to FIG. 5, the exemplary steps may begin with step 502 when multimedia content may arrive at a source MNI. In this regard, the source MNI, a destination MNI, and a bus coupling the source MNI to the destination MNI may scalable based on, for example, the type and/or data rate of multimedia content to be communicated. Subsequent to step 502, the exemplary steps may advance to step 504. In step 504, the source MNI may process the content prior to transmitting the content over a bus such as the bus 312. In this regard, the source MNI may parse, format, encapsulate, decapsulate, packetize, depacketize, or otherwise format the multimedia content such that the content may be suitable for transmission over a bus such as the bus 312. For example, in one embodiment of the invention, an HDMI datastream may arrive at the source MNI and the source MNI may convert the HDMI datastream into one or more raw audio and/or video streams for transmission via a bus such as the bus 312.

Subsequent to step 506, the exemplary steps may advance to step 506. In step 506, the source MNI may perform bus arbitration to coordinate the communication of the multimedia data to a destination MNI. In this regard, the bus may be a shared bus and thus coordination may be necessary to ensure data collisions and similar problems are prevented. Subsequent to step 506, the exemplary steps may advance to step 508. In step 508, the source MNI may begin transmitting the multimedia data to a destination MNI. In various embodiments of the invention, the data may be transmitted over one or more physical links which may enable serial and/or parallel communications. Subsequent to step 510, the exemplary steps may advance to step 512. In step 512, data received by the destination MNI may be processed. In this regard, the destination MNI may parse, format, encapsulate, decapsulate, packetize, depacketize, or otherwise format the data such that the data may communicated, for example, to a networking interface such as the LAN subsystem 314. For example, raw pixel and/or audio data may arrive at the destination MNI and the destination MNI may format the data into one or more DisplayPort packets. Subsequent to step 512, the exemplary steps may advance to step 514. In step 514, the data received via the destination MNI may be communicated to, for example, a display, speakers, or via a local area network (LAN) to a remote client.

Aspects of a method and system for data exchange with an integrated multimedia and Ethernet enabled LAN subsystem are provided. For example, aspects of the invention may enable communication of multimedia content between the GPU 406 and the LAN subsystem 414. In this regard, a multimedia networking interface, such as the MNIs 402a and 402b, may be enabled to process multimedia content and communicate the content between a networking interface and one or both of a graphics processor, such as the GPU 306, and an audio processor. In some instances, the networking interface may comprise a LAN interface, such as the LAN subsystem 314, and may enable communicating multimedia data over a network. The multimedia networking interface may be enabled to communicate auxiliary and/or control data associated with communicated multimedia content.

Exemplary aspects of the invention may enable the multimedia networking interface to process multimedia content prior to or subsequent to transmission of said content. In this regard, the multimedia networking interface may be enabled to parse, format, encapsulate, decapsulate, packetize, depacketize, and/or otherwise format the multimedia content prior to communicating the data over a bus such as the bus 312. In this manner, aspects of the invention may enable encapsulating data into one or more protocol data units such as DisplayPort micro-packets. Additionally, aspects of the invention may enable coding and/or transcoding multimedia content of a first format to multimedia content of a second format. In this regard, exemplary formats may comprise DVI, HDMI, DisplayPort. Furthermore, the multimedia content may be compliant with one or more of MPEG, MPEG-2, MPEG-4, and/or MPEG-4 part 10 standards.

Another embodiment of the invention may provide a machine-readable storage, having stored thereon, a computer program having at least one code section executable by a machine, thereby causing the machine to perform the steps as described herein for data exchange with a multimedia and Ethernet enabled LAN subsystem.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing information in a communication system, the method comprising:
   processing via a multimedia interface integrated within a networking interface, multimedia content handled by said networking interface;
   communicating via said integrated multimedia interface, said processed multimedia content between said networking interface and one or both of a graphics processor and an audio processor, wherein said processing and said communicating occurs without intervention from a processor external to said networking interface; and
   arbitrating among resources by said integrated multimedia interface when processing said multimedia content.

2. The method according to claim 1, wherein said networking interface comprises a local area network (LAN) interface.

3. The method according to claim 1, comprising communicating via said integrated multimedia interface, auxiliary multimedia data associated with said processed multimedia content.

4. The method according to claim 3, wherein said auxiliary multimedia data comprises control data.

5. The method according to claim 1, comprising parsing by said integrated multimedia interface, said multimedia content.

6. The method according to claim 5, wherein said integrated multimedia interface enables said parsing of said multimedia content from one or more protocol data units.

7. The method according to claim 1, comprising formatting by said integrated multimedia interface, said multimedia content.

8. The method according to claim 7, wherein said formatting comprises encapsulating, decapsulating, and packetizing, of said multimedia content.

9. The method according to claim 1, comprising encapsulating by said integrated multimedia interface, said multimedia content into one or more DisplayPort micro-packets.

10. The method according to claim 1, comprising encoding or transcoding by said integrated multimedia interface, said multimedia content comprising video content having a first format to corresponding video content having a second format.

11. The method according to claim 1, comprising encoding or transcoding by said integrated multimedia interface, said multimedia content comprising audio content having a first format to corresponding audio content having a second format.

12. The method according to claim 1, comprising encoding or transcoding by said integrated multimedia interface, said multimedia content comprising text content having a first format to corresponding text content having a second format.

13. The method according to claim 1, wherein said multimedia content is compliant with one or more of MPEG, MPEG-2, MPEG-4, MPEG-4 PART 10, and HDMI standards.

14. A system for processing information, the system comprising:
one or more circuits within a multimedia interface integrated within a networking interface that enable processing of multimedia content handled by said networking interface;
said one or more circuits enable said integrated multimedia interface to communicate said processed multimedia content between said networking interface and one or both of a graphics processor and an audio processor, wherein said processing and said communicating occurs without intervention from a processor external to said networking interface; and
said one or more circuits enable said integrated multimedia interface to arbitrate among resources when processing said multimedia content.

15. The system according to claim 14, wherein said networking interface comprises a local area network (LAN) interface.

16. The system according to claim 14, wherein said one or more circuits enable communication of auxiliary multimedia data associated with said processed multimedia content via said integrated multimedia interface.

17. The system according to claim 16, wherein said auxiliary multimedia data comprises control data.

18. The system according to claim 14, wherein said one or more circuits enable parsing of said multimedia content.

19. The system according to claim 18, wherein said one or more circuits enables said parsing of said multimedia content from one or more protocol data units.

20. The system according to claim 14, wherein said one or more circuits enable formatting of said multimedia content.

21. The system according to claim 20, wherein said formatting comprises encapsulating, decapsulating, and packetizing, of said multimedia content.

22. The system according to claim 14, wherein said one or more circuits enable encapsulation of said multimedia content into one or more DisplayPort micro-packets.

23. The system according to claim 14, wherein said one or more circuits enable encoding or transcoding of said multimedia content comprising video content having a first format to corresponding video content having a second format.

24. The system according to claim 14, wherein said one or more circuits enable encoding or transcoding of said multimedia content comprising audio content having a first format to corresponding audio content having a second format.

25. The system according to claim 14, wherein said one or more circuits enable encoding or transcoding of said multimedia content comprising text content having a first format to corresponding text content having a second format.

26. The system according to claim 14, wherein said multimedia content is compliant with one or more of MPEG, MPEG-2, MPEG-4, MPEG-4 PART 10, and HDMI standards.

* * * * *

UNITED STATES PATENT AND TRADEMARK OFFICE
CERTIFICATE OF CORRECTION

| | |
|---|---|
| PATENT NO. | : 7,949,004 B2 |
| APPLICATION NO. | : 11/839366 |
| DATED | : May 24, 2011 |
| INVENTOR(S) | : Wael William Diab |

It is certified that error appears in the above-identified patent and that said Letters Patent is hereby corrected as shown below:

Title page, item (75) after Inventor: "Wael William Diab," please delete "Carlsbad, CA (US)" and insert --San Francisco, CA (US)--.

Signed and Sealed this
Nineteenth Day of July, 2011

David J. Kappos
*Director of the United States Patent and Trademark Office*